A. H. MARKEE.
COOKING STOVE.
APPLICATION FILED SEPT. 13, 1920.
1,410,024.
Patented Mar. 21, 1922.
2 SHEETS—SHEET 2.
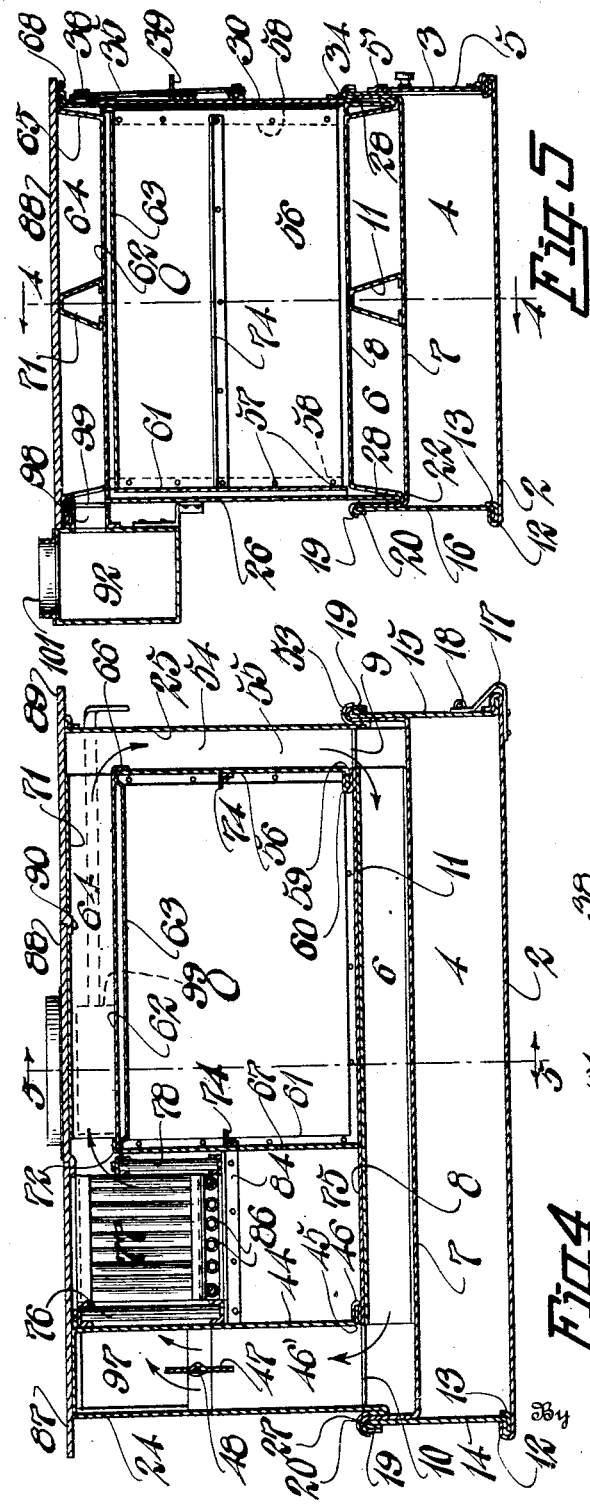
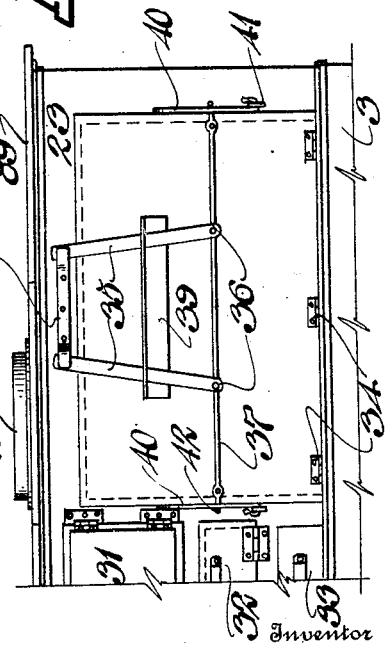
Inventor
Anton H. Markee
Herbert E. Smith
Attorney

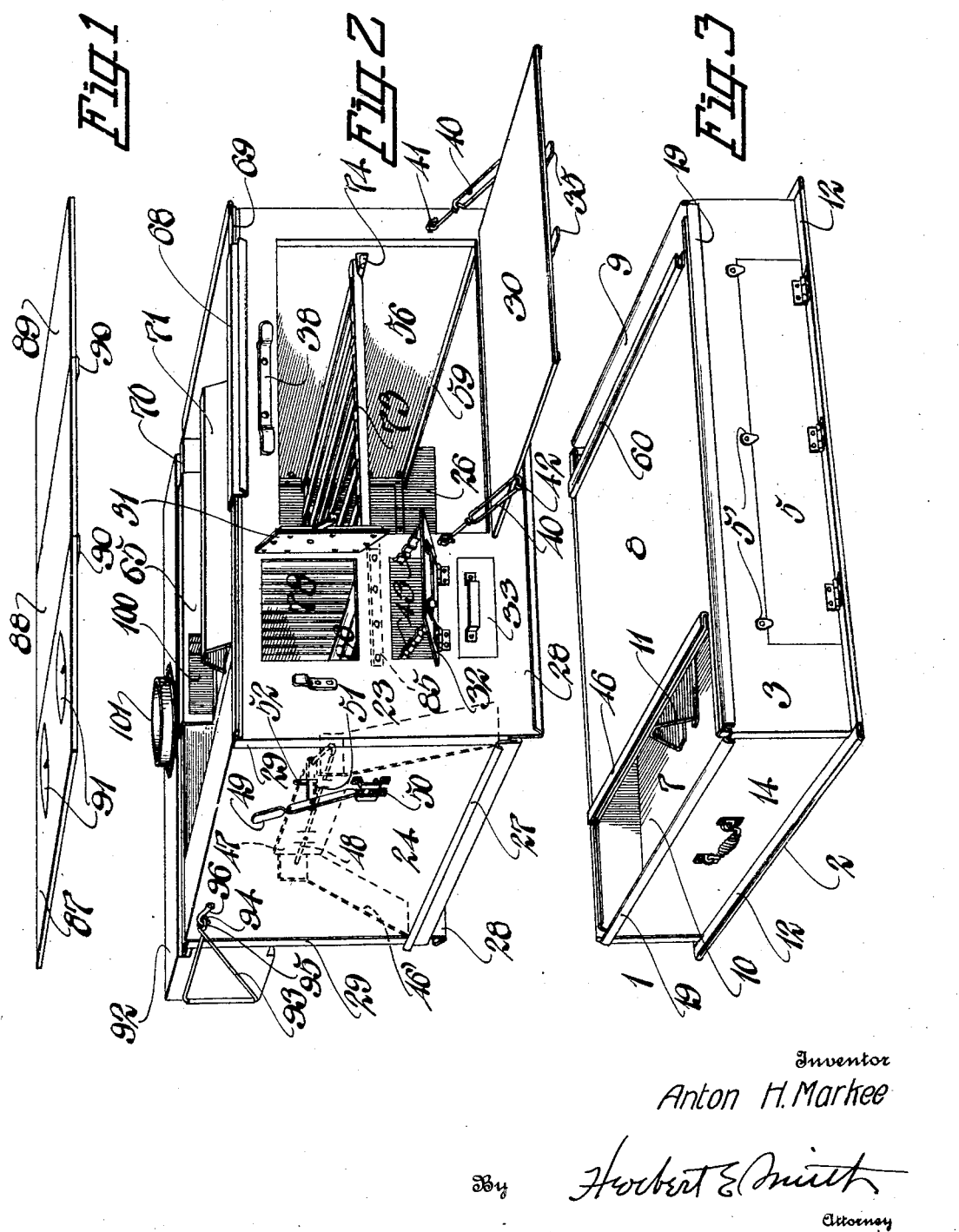

UNITED STATES PATENT OFFICE.

ANTON H. MARKEE, OF AMERY, WISCONSIN.

COOKING STOVE.

1,410,024.      Specification of Letters Patent.      Patented Mar. 21, 1922.

Application filed September 13, 1920. Serial No. 409,930.

*To all whom it may concern:*

Be it known that I, ANTON H. MARKEE, a citizen of the United States, residing at Amery, in the county of Polk and State of Wisconsin, have invented certain new and useful Improvements in Cooking Stoves, of which the following is a specification.

My present invention relates to improvements in cooking stoves of the knock down or separable type, designed especially as a portable heating device for use in camps and for convenient transportation from place to place, but is equally adaptable for domestic use.

The primary object of the invention is the provision of a stove of this character which may be packed into small compass for storage or for transportation on the back of a mule or horse, which may be quickly assembled, and with equal facility be dismantled by knocking down or separating its component parts. To this end the invention consists in certain novel combinations and arrangements of parts involving a revertible draft, base heating type of stove in which the three essential members comprising the top, body, and base of the stove are so equipped with co-operating means and devices that the radiated heat from the firepot is utilized to best advantage to heat the oven as well as the base or warming oven and to furnish heat to food or provisions being cooked on the top of the stove. In carrying out my invention I construct the separable parts of the stove with means whereby these parts may with convenience and dispatch be assembled and joined and interlocked one with another to secure a compact, stable and reliable, portable cooking stove especially adapted for rough handling and frequent assemblage and dismantling, thus insuring durability and efficiency in the implement.

In the accompanying drawings I have illustrated one complete example of the physical embodiment of my invention, wherein the parts, made up of sheet metal and some of cast or wrought metal, are combined and arranged according to the best mode I have thus far devised for the practical application of the principles of my invention.

Figures 1, 2 and 3 illustrate, in perspective, the several divisions of the stove. Figure 1 illustrates the sectional stove top, with lids.

Figure 2 discloses the stove body including the baking oven, fire pot and draft flues, &c.

Figure 3 depicts the base or heating oven portion of the stove.

Figure 4 is a vertical, longitudinal sectional view through the assembled stove.

Figure 5 is a transverse, vertical, sectional view on line 5—5 of Figure 4.

Figure 6 is a detail of a part of the front of the stove illustrating particularly the oven-door fastening device.

Figure 7 is a perspective view of one of the units forming the fire pot of the stove.

As before stated, for facility in manufacture, and convenience in assembly and packing, the major part of the stove housing is made up of sheet metal, the top preferably being cast metal, and the grate and walls of the firepot comprising wrought or cast metal pipes or tubular members.

The base of the stove as indicated by the numeral 1 is provided with a bottom 2 and front wall 3 and may be utilized as a warming oven or chamber 4 when the stove is assembled, or the base may be used as a container or receptacle for storing parts if desired when transporting the dismantled stove. The walls of the base, however, are separable and may be disengaged and packed away in small compass for transportation. The warming oven is accessible through the door 5, hinged on the front wall 3 of the base, and the door is closed, or held in closed position by one or more turn buttons 5' as in Figure 3.

A heating flue 6 extends longitudinally of the base from end to end, the lower wall of the flue being constituted by the flue sheet 7 extending over the entire inner area of the base and forming a top for the warming oven, while the upper flue sheet 8 terminates short of the ends of the base in order to provide an inlet opening 9 and an outlet opening 10 to the flue. At the underside of the top flue sheet 8 is riveted a bridge or brace 11, of an inverted V-shape in cross section, centrally located in the flue, extending from the inner edges of the respective openings 9 and 10 of the flue, and forming a part thereof for the passages of heated gases.

Along the edges of the base bottom are provided inwardly and overlapping flanges 12 in which the ribs 13 of the end walls 14 and 15 of the base may slide and be secured, as may also ribs on the front wall 3 and rear wall 16 of the base, and a spring hasp 17 secured to the bottom plate of the base as in Figure 4, is perforated to snap over the eye 18 on the wall 15 of the base, a peg being passed through the eye to secure the parts if required.

The lower flue sheet is formed as a pan to rest in the top of the base 1, and the upper edges of the pan have outwardly and downwardly turned flanges 19 forming a rectangular retaining device to fit over the four ribbed top edges 20 of the base walls and hold these walls together. The formation of the flue sheet in the shape of a pan not only holds the walls of the base against outward displacement, but also prevents inward collapse of the base by bracing its walls against inward movement. Thus the separate members of the base may be interlocked with the bottom plate and the flue sheet 7 engaging the vertical walls of the base, and in addition the top flue sheet has front and rear, longitudinally extending V-walls and flanges 22 at their edges to fit over the flanges 19 of the front and rear walls of the lower flue sheet.

The body of the stove, as indicated in Figure 2 is rectangular in shape and comprises the front plate 23, side plates 24 and 25 and rear plate 26. The two side plates, at their lower edges, are fashioned with flanges 27 27 to fit over the complementary flanges 19 on the ends of the pan or lower flue sheet 7, and the front and rear plates of the stove body are equipped with extended, flanged bottom ends 28 28 to fit in the V-shape front and rear walls of the upper flue sheet 8.

The several parts of the stove body are separable, and interlocked together, but are of differing formations. The front and rear plates are each provided with vertically extending end flanges 29 to overlap the adjoining edges of the sides 23 and 24, and the front plate is cut away or cut out to provide openings for the oven door 30, the fire box door 31, draft door 32 and ash pan 33, as shown in their relative positions in Figure 2. The oven door is hinged at 34 to the front plate and is provided with a novel form of fastening device employing the pair of co-acting links 35 pivoted at 36 on a bar of metal 37 that is riveted or otherwise secured to the front of the oven door. In proper position on the front plate, above the oven door and its links is located a fixed keeper 38, riveted to the plate and with its ends offset to receive the respective links 35, while an operating slide 39 is utilized to engage or disengage the free ends of the links from the keeper. The slide is of angle iron metal, slotted near the ends of its horizontal plate to permit the required swinging movement of the links on their pivots, and it will be apparent that when the slide is elevated from the position of Figure 6 the free ends of the links will be swung outwardly and disengaged from their common keeper, and with the hand grasping the slide member the unlocked oven door may now be lowered to position of Figure 2.

In order that the opened oven door may be used as a shelf I provide a pair of slotted links 40, pivoted at 41 to the front plate of the stove, and the free ends of these slotted links are engaged by the hooked ends 42 of the fixed bar 37 on the door. In the open or lowered position of Figure 2 the oven door is supported by the slotted links as described and may be utilized as a shelf for various purposes.

The draft door 32 is hinged at its lower edge to the front plate of the stove and is adjustable to vary the draft therethrough by means of the corrugated side straps 43 of sheet metal. These straps are attached at the edges of the sides of the door and project inwardly of the stove so that a selected corrugation may be engaged with the edge of the wall of the doorway. Thus the door may be opened and these resilient corrugated straps pass over the edges of the door opening and will engage and hold the door at the point desired.

The left end of the stove is formed as a separate single structure or hood of which the end plate 24 forms the outer wall, and the inner plate 44 forms the inner wall. At its lower edge this inner wall is provided with a flange 45 which fits into the flange 46 of the upper flue sheet in the base of the stove, and the outer wall is retained by engagement of the flanged bottom edge 27 over the flange 22 of the lower flue sheet. The hood is closed at its top, but open at its bottom portion to the outlet end 10 of the lower draft flue 6, and over this opening 10 an arch 46' is formed of a pair of deflector plates with a draft damper 47 pivoted at the top and adapted to close or partially close the opening at the upper ends of these deflector plates. The plates incline forwardly and rearwardly in the hood, as best seen in dotted lines in Figure 2, and the axis of the pivot 48 of the damper extends from front to rear of the stove. The damper is controlled from the exterior of the hood and stove by means of a lever 49, pivoted at 50 on the end wall 24 of the stove, and a rack link 51 passed through a slot 52 in the wall 24, which latter is pivotally connected to a crank end of the axial shaft 48 of the damper. By swinging the lever the damper may be regulated through this described connection and the damper may be retained in adjusted position by engagement of the rack link 51 with the lower edge wall of the slot 52 through which it passes.

The right end wall 25 is fashioned with rearwardly extending horizontal flange 53 which fits over the complementary flange 19 of the lower flue sheet of the stove base, and this wall is fashioned with front and rear, inwardly extending plates 54 which form a downdraft flue 55. The inner wall of this flue is constituted by the right end wall 56 of the oven which latter wall is riveted at 57 (Fig. 5) to the front and rearwardly extending, narrow perforated flanges 58 on the flanges or plates 54 (dotted lines in Fig. 5) of the right end wall 25 of the stove. The two plates 25 and 56 are thus held together as a rigid structure to form the right end of the stove, the right end of the oven, and to provide the downdraft flue of the stove opening into the lower flue of the stove base. In addition to the clamping joint at 53 over the top edge of the lower flue sheet flange, this wall structure or flue structure has an inturned flange 59 which slips into the groove formed by the double flange 60 at the right top edge of the upper flue sheet of the lower flue.

The rear wall 26 of the stove forms the back wall of the oven 0, and this wall is provided with a lining 61 for the oven, as is also the top plate 62 of the oven provided with a similar sheet metal lining 63. The top wall of the oven forms the lower sheet of the upper draft flue 64 which passes across from left to right in Figure 4 over the oven to communicate with the downdraft flue 54 at the right end of the stove. The top plate 62 is fashioned with upwardly extending, and somewhat outwardly flaring front and rear flanges 65 integral therewith to form the front and rear walls of the flue 64, and this plate 62, which is of sufficient length to cover the oven only, is provided with downwardly extending narrow flanges 66 which fit over the right end wall 56 of the oven and also over the left end wall 67 of the oven.

At their upper edges the front and rear flanges 65 of the flue sheet 62 are provided with overhanging flanges 68 which fit over the complementary flanges or ribs 69 and 70 on the stove front 23 and the stove back 26.

An A-shaped bridge wall 71 is riveted to the top surface, at the center of the upper flue sheet 62, similar to the bridge wall 11 in the stove base or lower flue, and this bridge or brace which extends in the direction of travel of gases of combustion through the flue, 64, also forms a part of the flue.

The left-end oven-plate 67 is joined to the left end of the flue sheet 62, at 72 (Fig. 4), and stands upon the top face of the upper flue sheet 8 of the stove base. A shelf 73 may be supported in the oven on the two angle iron supports 74, 74 on the right and left walls of the oven, which in addition to performing its usual functions, also provides a brace for stabilizing the structure.

Between the inner wall 44 of the hood at the left end of the stove, and the plate 67 forming the left end wall of the oven, the ash pan 75 and the combustion chamber or fire box are located, access to the ash pit being had through the draft door and ash pit door, previously described.

In Figure 7 one of the fire box walls is illustrated in perspective, which may be indicated as the left wall 76 in Fig. 4, the rear wall 77, and right wall 78 being of the same construction. Each of these walls is made up of a plurality of tubular members or pipe sections 79 retained between the headers 80 and 81 made up of channel iron plates of proper size to enclose the ends of the tubes or pipes, and joined by bolts 82 which may pass through the tubes and through the two headers, and the headers are slotted as at 83 for air circulation from the ash pit through the headers and tubes for retaining the tubes in comparatively cool condition.

These walls of the fire pot are erected upon the angle iron brackets 84 and 85 on the respective rear and front walls of the stove, the front bracket 85 being indicated in dotted lines Figure 2. The grate 86 is constructed similarly to the walls of the fire box and rests upon these two brackets 84 and 85, but of course the tubes of the grate are spaced apart for draft of air therethrough from the ash pit to support combustion in the fire box. At its right upper end the fire box communicates with the upper flue 64 for passage of gases of combustion and heat units, and the entire stove top is covered by the sectional, cast metal top comprising the separable plates 87, 88, 89, which plates rest upon the walls of the stove and upper flue and hood, and have supporting flanges 90 as usual. The top plate 87, directly over the fire pot, has openings for the customary lids 91, and the plates 88 and 89 over the flue 64 rest on the bridge 71 as a central support and upon the top edges of the stove walls, the weight of the stove top being sufficient to hold it in stable position.

At the rear and top of the stove is located a smoke box 92, extending the full length of the stove and made up as a rigid structure, rectangular in cross section, and extending the full width of the stove from end to end. The smoke box is detachably connected to the stove body by means of the pivoted wire bails 93, which may be turned around flat against the inner wall of the box when not in use, and are provided with eyes or loops 94 to slip horizontally over eyes 95 projecting from the end walls of stove in proper position, and by means of the hooks 96 the loops are secured on the eyes in manner well understood.

At its left end the smoke box communicates with the interior of the hood, as at 97 in Figure 4 as the outlet to the box for the indirect draft, while a direct draft may be had to the box from the upper flue 64 through opening 98 in Figure 5, this draft opening being controlled by a draft damper or slide 99 in connection with the slot 100 in the back wall of the flue 64. The smoke passes from the box through the central outlet 101.

Handles and other accessories are utilized in connection with the separable parts as required, and the different members of the knockdown stove are of such size and weight as to be readily manipulated in assembling and dismantling the stove. When using the stove for heating purposes the gases of combustion pass from the fire box, to the right in Figure 4 through the top flue over the oven 0, thence downwardly at the right end of the stove through the downdraft flue 54, and returning to the left end of the stove through the return draft flue 6 above the warming oven, and by way of the hood into the smoke box and thence out through the draft opening 101. In starting the fire a direct draft may be used from the fire box through the upper flue 64 and thence out through the center of the smoke box as described, and of course this direct draft may be used if it is desired to remove heated air currents from the lower flue and warming oven.

It will be understood that the different pieces of the stove are provided with interlocking ribs and flanges which may be fitted or slid into co-operative position in assembling the stove and that these interlocking joints serve to hold the different members in stable position, adjacent parts of the stove bracing and supporting other parts, and the entire stove forming a rigid and mechanically correct structure when properly set up.

Having thus fully described my invention, what I claim as new and desire to secure by Letters Patent is—

1. The combination in a knockdown stove with the body thereof and draft connections, of a base forming a warming oven, a lower flue sheet in the form of a pan having flanged edges supported on the edges of the base, an upper flue sheet terminating short of the ends of the lower sheet to form inlet and outlet to the flue between said sheets, and means for supporting the body on said base.

2. The combination with a stove base having detachable connected walls, of a lower flue sheet therein formed as an open top pan having overhanging flanges to fit over and secure the walls of said base, a shorter upper flue sheet supported on the lower sheet, and a stove body having a firepot and draft connections supported on said base as described.

3. The combination with a stove base having separable walls, of a pan forming a lower sheet and having flanges engaging the upper edges of said walls, a shorter upper sheet providing inlet and outlet openings to the flue between said sheets, said upper sheet having V-shape flanges, a stove body having members supported in said V-flanges, a firebox in the stove body and draft connections as described.

4. The combination in a stove body comprising separable elements and locking means therefor of a firebox, a stove top, an oven adjacent the fire box comprising end walls and forming a downdraft flue between one of said walls and an end of the body, a flue sheet detachably connected to said oven walls and having front and rear plates overhanging and supported on the top edges of the stove body to form a flue beneath the stove top, a smoke box at the rear of the stove and communication between said smoke box and the flue beneath the stove top for a direct draft from the firebox.

5. The combination with the body of a knock down stove, including draft connections and an oven, of brackets fixed on the front and rear walls of the stove, a firepot comprising removable side walls and a grate supported on said brackets, said removable walls each comprising a series of parallel tubes and headers at the respective ends of each series of tubes, as described.

6. The combination with the body of a knock down stove, including draft connections and an oven, of brackets fixed on the front and rear walls of said stove, a fire pot, and grate, said fire pot comprising removable walls supported on said brackets, said removable walls each comprising a series of parallel tubes, channel iron headers having slots therein and fitting over the ends of said series of tubes, and securing bolts passed through some of said tubes and the headers.

In testimony whereof I affix my signature.

ANTON H. MARKEE.